(12) United States Patent
Sadakiyo et al.

(10) Patent No.: US 7,534,458 B2
(45) Date of Patent: May 19, 2009

(54) PROCESS FOR PRODUCING RICE FLOUR AND USE THEREOF

(75) Inventors: Tsuyoshi Sadakiyo, Okayama (JP); Hideo Bunya, Okayama (JP); Hiroto Chaen, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 710 days.

(21) Appl. No.: 10/535,255

(22) PCT Filed: Nov. 25, 2003

(86) PCT No.: PCT/JP03/15006

§ 371 (c)(1), (2), (4) Date: May 18, 2005

(87) PCT Pub. No.: WO2004/047561

PCT Pub. Date: Jun. 10, 2004

(65) Prior Publication Data

US 2006/0198933 A1    Sep. 7, 2006

(30) Foreign Application Priority Data

Nov. 25, 2002   (JP) .............................. 2002-341389

(51) Int. Cl.
*A23L 1/10*    (2006.01)
(52) U.S. Cl. .................. 426/463; 426/309; 426/455; 426/506; 426/507; 426/622
(58) Field of Classification Search .................. None
See application file for complete search history.

(56) References Cited

U.S. PATENT DOCUMENTS 5,747,300 A   5/1998  Nishimoto et al.
6,045,847 A * 4/2000  Nakamura et al. .......... 426/508

FOREIGN PATENT DOCUMENTS

| | | |
|---|---|---|
| EP | 0628 630 | 12/1994 |
| EP | 0 636 693 | 1/1995 |
| EP | 0 983 727 | 3/2000 |
| EP | 1 481 590 A1 | 12/2004 |
| GB | 2 097 004 | 10/1982 |
| JP | 61-037066 | 2/1986 |
| JP | 63-2439 | 1/1988 |
| JP | 63-22155 | 1/1988 |
| JP | 04-287652 | 10/1992 |
| JP | 05-068468 | 3/1993 |
| JP | 7-17077 | 7/1995 |
| JP | 7-213283 | 8/1995 |
| JP | 11-018701 | 1/1999 |
| JP | 11-032706 | 2/1999 |
| JP | 2002-175636 | 6/2000 |
| JP | 2001-123194 | 5/2001 |
| JP | 2002-45130 | 12/2002 |
| JP | 2003-274881 | 9/2003 |

OTHER PUBLICATIONS

"The Notification from Ministry of Health, Labor and Welfare", *EISHIN No. 13*, Apr. 26, 1999, pp. 1010-1041.

* cited by examiner

*Primary Examiner*—Lien Tran
(74) *Attorney, Agent, or Firm*—Browdy and Neimark, P.L.L.C.

(57) ABSTRACT

A process for producing rice flour, which comprises the steps of soaking material rice grains in water, crushing the resulting rice grains, penetrating α,α-trehalose or maltitol into the rice grains, partially drying the resulting rice grains, and milling the partially dried rice grains; rice flours obtainable by the process; and uses thereof for producing bakery products and noodles.

4 Claims, No Drawings

PROCESS FOR PRODUCING RICE FLOUR AND USE THEREOF

TECHNICAL FIELD

The present invention relates to a novel process for producing rice flour, rice flour obtainable by the process, and its uses for bakery products and noodles.

BACKGROUND ART

Recently, application of rice flour to fermented bakery products and noodles has been highlighted because rice is highly recognized as a healthy food. There are many suggestions for the process for producing unpolished- or polished-rice flour, which is favorable for producing bakery products and noodles as an substitute of wheat flour, using unpolished- or polished-rice as a material.

Unpolished rice flour is generally produced by the steps of roasting unpolished rice grains without polishing, and milling the resultant into flour. For example, a process for producing unpolished rice flour, comprising the steps of allowing to expand unpolished rice grains by heating and pressurizing, and drying and milling the resultant, was proposed as disclosed in Japanese Patent Kokai No. 22155/88. Also, as disclosed in Japanese Patent Kokai No. 45130/2002, a process for producing unpolished rice flour, comprising the steps of steaming unpolished rice grains, and drying and milling the resultant, has been proposed.

While, polished rice flour is generally produced by the steps of polishing unpolished rice by applying to a polisher for shaving bran, soaking the polished rice in water, and drying and milling the resultant by using various milling methods such as roll-type milling, impact-type milling, stamp-milling, and grinding with water. "JOSHINKO", a kind of polished rice flour produced by roll-type milling, and "JOYOKO", a kind of polished rice flour produced by stamp-milling are well known. Recently, there have been proposed several processes for producing polished rice flour, for example, a process comprising the steps of soaking rice grains in a solution comprising pectinase, dehydrating the resulting rice grains, milling the dehydrated rice grains to a fine rice flour, drying the flour to give a moisture content of about 15% (w/w) (hereinafter, "% (w/w)" is simply abbreviated as "%" in this specification), and baking the resulting flour at about 150° C. as disclosed in Japanese Patent Kokai No. 287,652/92; a process comprising the steps of soaking a material rice grains in a solution comprising enzymes such as hemicellulase, pectinase, and pectin esterase, drying the resulting rice grains, and milling the dried rice grains as disclosed in Japanese Patent Kokai No. 68,468/93; and a process comprising the steps of soaking rice grains in a solution comprising salts of organic acids and those with pectinase, dehydrating and drying the soaked rice rice grains, and milling the dried rice grains as disclosed in Japanese Patent Kokai No. 175,636/2000.

As described above, the processes for producing rice flour (throughout the specification, both unpolished- and polished-rice flours may be simply called as "rice flour") are different depending on which unpolished-rice or polished-rice is used as a material, because the properties of those rice grain are different. Therefore, in the case of producing both unpolished- and polished-rice flours, there are disadvantages of requiring specific hardwares and processes, which are suitable therefor, and high costs for producing them. While, a method for producing rice flour from both unpolished- and polished-rice using a single process as above has been also proposed. For example, a process for producing rice flour, comprising the steps of soaking raw rice grains including unpolished rice into water which contains an amylase; freezing the soaked rice; and drying and milling the resultant, was disclosed in Japanese Patent No. 3,075,556. However, the process has disadvantages of requiring a process of freezing rice and a relatively high cost for the production.

The present invention was accomplished to solve the above various disadvantages of conventional processes for producing rice flour. The first object of the present invention is to provide a process for producing rice flour, which enables to prepare unpolished- and polished-rice into rice flours in an single method on an industrial scale and inexpensively. The second object of the present invention is to provide rice flour produced by the process and uses thereof for producing bakery products and noodles.

DISCLOSURE OF INVENTION

To solve the above objects, the present inventors have extensively studied to improve a process for producing rice flour from the viewpoint of using saccharides.

As a result, the present inventors found that rice flour can be unexpectedly produced from both unpolished- and polished-rice using a single method comprising the steps of:

soaking raw rice grains as a material in water according to the conventional method;

crushing the resulting rice grains mechanically for cracking unpolished rice grains or crushing polished rice roughly; penetrating α,α-trehalose (hereinafter, "α,α-trehalose" is abbreviated simply as "trehalose" throughout the specification) or maltitol into the crushed rice grains; partially drying the resultant; and milling the partially-dried rice grains to form rice flour.

The present inventors also found that rice flour obtained by the process has satisfactory properties for processing to the rice flour products, especially, for producing bakery products, and its smell of bran characteristic of rice, is suppressed because of the incorporation of trehalose or maltitol; and accomplished the present invention.

Therefore, the present invention solves the above object by providing a process for producing rice flour, comprising the steps of soaking material rice grains in water, crushing the soaked rice grains, penetrating trehalose or maltitol into the resulting rice grains, partially drying the resulting rice grains, and milling the partially-dried rice grains to form rice flour; and rice flour obtainable by the process. According to the process of the present invention for producing rice flour, rice flour having a satisfactory quality and property for processing to the rice flour products, especially, for producing bakery products and noodles, can be produced inexpensively and on a large scale without freezing material rice grains, using a single method without discriminating the material rice grains and a conventional milling plant.

BEST MODE FOR CARRYING OUT THE INVENTION

Raw rice grains can be used in the present invention as materials independently of the kinds of rice such as non-glutinous rice and glutinous rice. Also, unpolished rice of waste rice grain, old rice, and "minimum-access rice" as well as selected unpolished rice; and polished rice obtainable by polishing them can be advantageously used. Optionally, in the case of polished rice, those having various polishing grades, for example, of 30%, 50%, and 70%, and polished rice with embryo buds can be also used as materials as well as standard polished rice. In addition, sprouted rice can be advantageously used as materials.

At first, raw rice grains are soaked in water for, usually, 1-24 hours, preferably, 5-16 hours. Although the water for soaking is preferable to be fresh water, water admixed with quality-improving agents such as seasonings, colorings, reinforcements, emulsifiers, etc., can be optionally used. It is not necessary to control water temperature strictly for soaking, and usually ambient temperature is selected. It is desirable that rice grains are allowed to absorb water by soaking in water and controlled to give a moisture content of, usually, 28% or higher, preferably, 30-33% after soaking. Usually, in a process of producing rice flour, raw rice grains are washed with water to remove contaminants and impurities which adhere to them. In the process for producing rice flour of the present invention, rice grain can be washed with water before or after soaking in water, and the timing can be properly selected. The moisture content of rice grains applicable to the present invention can be measured by the steps of milling the rice grain, drying the resulting rice flour at 135° C. for two hours, and measuring the change of weight according to the drying by heating method described in the notification from Ministry of Health, Labor, and Welfare, "EISHIN No.13" (Mar. 26, 1999) "Analytical method for nutritional components on expression standard for nutrition".

Successively, rice grains, obtained by soaking in water and washing with water, are mechanically crushed. In the case of using unpolished rice grains as material, it is preferable to crush unpolished rice grains to the extent of at least causing cracks, and optionally, of crushing partly or wholly. In the case of using polished rice grains as material, it is preferable to crush polished rice grains into a roughly crushed form. The crushing process is essential in such a case. Since unpolished rice grain has a hard outer-layer composed of cuticle, testa, and pericarp, the penetration of trehalose or maltitol into rice grain, which is done by the following step, can not be done sufficiently without allowing to cause cracks in unpolished rice grain. While, in the case of polished rice grain, it is not necessary to crush rice grain if taking a longer time for penetrating trehalose or maltitol. However, taking account of the efficiency of penetrating trehalose or maltitol, it is preferable to crush polished rice grain roughly for increasing surface area. Machines for crushing rice grain is not restricted as far as it can be used for such a purpose, and conventional roll-type milling machine and roll-type machine for producing noodles can be advantageously used without special tuning. It is preferable to adjust the slit width of the roll for crushing to 1-2 mm in the case of unpolished rice grains, and to 2-3 mm in the case of polished rice grains. By the above procedure, unpolished rice grains are cracked, whereas polished rice grains are roughly crushed.

Successively, trehalose or maltitol is penetrated into the cracked unpolished rice grains or the roughly crushed polished rice grains, obtained by the above crushing process. Concretely, trehalose or maltitol, in an amount of, usually, 3-20%, preferably, 8-15%, on a dry solid basis, to the weight of raw rice grains before soaking in water, is sifted over unpolished- or polished-rice grains, and the mixture was stirred uniformly. Trehalose or maltitol can be used in the form of a powder or solution. In the case of sifting powdery trehalose or maltitol over rice grains, the sifted saccharide melts on the surface of rice grains and then penetrates into unpolished rice grains through the cracks formed by crushing or into polished rice grains through the surface increased in area by rough crushing. In the case of spraying a solution containing trehalose or maltitol on rice grains, the solution penetrates unpolished- or polished-rice grains through the above mentioned routes. Although the time for penetrating trehalose or maltitol into rice grains is different depending on the process used with heating or not; 30-60 minutes would be sufficient. Origin of trehalose or maltitol used in the process is not restricted. For example, hydrous crystalline trehalose obtainable from starch by enzymatic saccharification, disclosed in Japanese Patent Kokai No. 170,977/95, and anhydrous crystalline maltitol obtainable by hydrogenating maltose, disclosed in Japanese Patent No. 2,439/88, can be advantageously used. Commercialized trehalose and maltitol products can be also used. For example, "TREHA®", a high purity hydrous crystalline trehalose product (trehalose content: 98.0% or higher) and "FUNMATSU MABIT®", a maltitol powder (maltitol content: 93.5% or higher), both commercialized by Hayashibara Shoji Inc., Okayama, Japan, can be advantageously used.

Using rice flour obtainable by penetrating trehalose or maltitol into rice grains for producing bakery products, fermented bread having a satisfactory bulk can be obtained as described later. While, fermented bread having an unsatisfactory bulk is obtained by using rice flour produced without the saccharide-penetration process. From the above results, it is supposed that the damage of rice flour starch, which is occurred by milling, is suppressed by penetrating trehalose or maltitol into material rice grains.

The applicant disclosed in Japanese Patent Kokai No. 123, 194/2001 that the formation of volatile aldehydes from fatty acids contained in bran or embryo and the generation of "smell of rice bran", so-called, are strongly suppressed by incorporating trehalose and/or maltitol into unpolished rice grains in the cases of polishing unpolished rice and producing pre-washed rice because they suppress the decomposition of fatty acids per se; and polished rice and pre-washed rice, both having a high quality, can be produced. The penetration of trehalose or maltitol into rice grains in the present process for producing rice flour leads incorporates trehalose or maltitol into rice flour products. Therefore, it is preferable for suppressing "smell of rice bran", which is originated from bran and/or embryo contained in rice flour products.

Rice grains, produced by penetrating trehalose or maltitol, are partially dried before milling. The partial drying as referred to as in the present invention means that rice grains, produced by penetrating trehalose or maltitol and having a moisture content of about 30%, is dried to give a moisture content of 14-25%. In the case of using rice grains having a moisture content of higher than 25%, it hinders to the operation of milling machine because it increases the formation of adhesive rice flour in the process of milling. In the case of using rice grains having a moisture content of lower than 14%, rice flour having a moisture content of lower than 8% is produced by evaporating during the milling process without causing any problem for milling. However, such rice flours have unsatisfactory processing properties and gives bread having an unsatisfactory bulk at the test for producing bakery products described later. The partial drying can be done after or in parallel with the penetration of trehalose or maltitol into rice grains. The partial drying of rice grains is preferably done at temperatures of lower than 60° C.

The rice grains obtained by the partial drying can be easily milled by conventional milling methods such as roll-, impact-, and stamp-millings. Although such milling machines are not specifically restricted, it is desirable to use a machine which gives rice flour having an average particle size of 30-80 μm and a narrow particle size distribution as much as possible, as regard to the processing properties (qualities for producing bakery products) as described later. Further, for producing rice flour having a high quality, it is desirable to collect rice flour having the above average particle size by sieving. Furthermore, it is desirable to adjust the moisture content of final rice flour product to, usually, 8-16%, preferably, 10-14%. Rice flours having a small average particle size or that dried to give a moisture content of lower than 8% show unsatisfactory processing properties, especially, unsatisfactory qualities in producing bakery products.

In the case of using unpolished rice as a material, rice flour produced by the present invention is a high quality unpolished rice flour rich in nutritional components such as amino acids, vitamins, minerals, etc., and having a suppressed smell of rice bran. In the case of using polished rice as a material, rice flour produced by the present invention is a high quality polished rice flour having a pure white color similar to "JOSHINKO" and "JOYOKO" and having a suppressed smell of rice bran. The both unpolished- and polished-rice flours have satisfactory processing properties and can be advantageously used as materials for premixed flours for producing bakery products, fermented bakery products, and noodles.

The following experiments concretely explain the present invention:

EXPERIMENT 1

Studies on Processes for Producing Rice Flour and Evaluation of the Qualities of Rice Flours Obtained Thereby In order to investigate the effects of the process of crushing and penetrating saccharides into rice and the moisture content of rice flour products on the quality of rice flour, five kinds of rice flours were produced by five different processes, which are different in process of crushing and penetrating saccharides into rice grains and the moisture contents of rice, and evaluated their qualities in the following Experiments 1-1 to 1-4. Further, in order to evaluate the qualities of these rice flours, their properties in producing bakery products were investigated by following test.

[Process for Producing Rice Flour]

Forty kilograms of unpolished- or polished-rice grains, a domestic variety of "AKEBONO", was soaked into 80 L of water for 16 hours for allowing to absorb water and then being washed with water to remove impurities. The resulting rice grains were divided into five portions, and five kinds of rice flours were produced according to the processes shown in Table 1, respectively.

TABLE 1

|  | Process | | | | |
| --- | --- | --- | --- | --- | --- |
|  | Process 1 | Process 2 | Process 3 | Process 4 | Process 5 |
| Soaking in water | Done | Done | Done | Done | Done |
| Crushing | ND* | Done | ND | Done | Done |
| Saccharide-penetrating | ND | ND | Done | Done | Done |
| Partial drying | Done | Done | Done | Done | Done |
| Milling | Done | Done | Done | Done | Done |
| Final moisture content of rice flour (%) | 8-16 | 8-16 | 8-16 | Less than 8 | 8-16 |

*ND; Not done

Crushing treatment of rice was done using "SUZUKI NOODLE MAKING MACHINE", a roll-type noodle making machine commercialized by Suzukimenko Co., Ltd., Okayama, Japan, whose slit width was adjusted to one millimeter for unpolished rice, or two millimeter for polished rice. Saccharide-penetrating treatment was carried out by the steps of sifting trehalose or maltitol over the grains in an amount of 10% (w/w) to the material rice grains and keeping the mixture at ambient temperature for 50 minutes with gentle stirring. "TREHA®", a high purity hydrous crystalline trehalose product (trehalose content: 98.0% or higher) and "FUNMATSU MABIT®", a maltitol powder (maltitol content: 93.5% or higher), both commercialized by Hayashibara Shoji Inc., Okayama, Japan, were used as trehalose and maltitol, respectively. After penetrating either of the saccharide into rice grains, the resulting grains were partially dried by heating at 60° C. for four hours to give a moisture content of about 24%. The resulting partially-dried rice grains were milled using "TORNADO MILL", a dry-type micro-pulverizing mill commercialized by Nikkiso Co., Ltd., Tokyo, Japan, whose outlet temperature was controlled at 60° C., and a fine rice flour having an average particle size of 30-60 mm was collected by sieving with a sifter.

The average particle size, moisture content, and smell of rice bran were investigated as the evaluation items of fine rice flour. The average particle size of rice flour was measured using "Model SA-CP3L", a centrifugal sedimentation-type particle size distribution analyzer commercialized by Shimadzu Corporation, Kyoto, Japan. The moisture content of rice flour was measured by the aforesaid drying by heating method. The smell of rice bran of rice flour was evaluated by the steps of putting any of the prepared rice flours into a polyethylene bag, preserving it at ambient temperature for 10 days under a sealed condition, and then smelling by twenty panelists. The results of evaluation of rice flours, which showed the smell of rice bran clearly, slightly, and hardly, were expressed with the symbols "C", "S", and "H", respectively.

[Test for Evaluating the Quality of Rice Flour for Bakery Products]

One hundred parts by weight any of the rice flours obtained above, 15 parts by weight of "GLURICH A", a gluten commercialized by Chiba Seifun Co. Ltd., Chiba, Japan, two parts by weight of "TREHA®", a trehalose product (trehalose content of 98.0% or higher) commercialized by Hayashibara Shoji Inc., Okayama, Japan, three parts by weight of sucrose, two parts by weight of sodium chloride, 10 parts by weight of sweet butter, two parts by weight of "KAIYO KOBO", a yeast commercialized by Sankyo Foods Co., Ltd., Tokyo, Japan, two parts by weight of "RULLULAN PF-20", a pullulan product commercialized by Hayashibara Shoji Inc., Okayama, Japan, and 75 parts by weight of water were kneaded by a kneader at 25° C. for five minutes at a low speed and for six minutes at a moderate speed. After suspending the kneading for a while, the mixture was further kneaded for four minutes to make into a dough. As regard to the rice flours produced by Processes 1 and 2, trehalose or maltitol was not incorporated thereunto because the two kinds of rice flours were produced without saccharide-penetration process. Therefore, in the case of rice flours obtained by Process 1 and 2, 90 parts by weight of any of rice flours and 10 parts by weight of trehalose or maltitol were used instead of using 100 parts by weight of the rice flour corresponding to the above material composition, for the purpose of equalizing the amount of saccharide among five kinds of doughs. After preparing doughs, they were fermented for 50 minutes as "floor time". After dividing the fermented doughs, they were rounded and fermented for 20 minutes as "bench time". Successively, the resulting doughs were placed in tins having a height of 3.5 cm to shape into an open top bread and further fermented for 50 minutes using a proofing room controlled at 40° C. and a humidity of 80%. After the fermentation, the doughs were baked for 45 minutes in an oven which the upper and lower temperatures were controlled at 230° C. and 200° C., respectively, to produce rice flour open top breads. Properties of the rice flours for producing bakery products were evaluated by measuring the bulk of the open top bread obtained above and examining the taste by twenty panelists. The bread showing a bad- or good taste was expressed with "No good" or "Good, and the results are in Tables. Further, as an overall evaluation, rice flours showing unsatisfactory smell of rice bran and properties for producing bakery products (bulk and taste) were expressed with "No good". Also, that showing unsatisfactory smell of rice bran or the properties was expressed with "Good". The rice flour showing both satisfactory results was expressed with "Better".

EXPERIMENT 1-1

Rice Flour Produced from Unpolished Rice Using Trehalose

Five kinds of unpolished rice flours were produced by the aforesaid processes for producing rice flours using a select domestic unpolished rice of a variety of "AKEBONO" as a material, and their qualities were evaluated by the test for the properties for producing bakery products. The results are in Table 2. Unpolished rice flours 1, 2, 3, 4, and 5 in Table 2 mean the unpolished rice flours produced by the processes of 1, 2, 3, 4, and 5, respectively.

TABLE 2

| Evaluation | | URF*1 | URF2 | URF3 | URF4 | URF5 |
|---|---|---|---|---|---|---|
| Analytic | APS**(μm) | 52 | 56 | 55 | 51 | 54 |
| data of | MC*** (%) | 9.6 | 10.1 | 10.3 | 6.7 | 12.4 |
| rice flour | SRB**** | C | C | H | H | H |
| Properties | Bulk (cm) | 9.1 | 9.3 | 9.0 | 10.5 | 11.8 |
| for bakery products | Taste | No good | No good | No good | Good | Good |
| Overall evaluation | | No good | No good | No good | Good | Better |

*Unpolished rice flour
**Average particle size
***Moisture content
****Smell of rice bran As shown in Table 2, unpolished rice flour 1 produced without the processes of crushing and trehalose-penetration showed a distinct smell of rice bran. The quality of unpolished rice flour 1 was evaluated to be unsatisfactory because the rice flour gave a bread with a relatively small bulk and unsatisfactory bulge and taste based on the evaluation of the properties for producing bakery products. Unpolished rice flour 2, produced with crushing but not with trehalose-penetration, showed unsatisfactory qualities as in the case of unpolished rice flour 1. Unpolished rice flour 3, produced with trehalose-penetration but not with crushing, showed a suppressed smell of rice bran by incorporating trehalose. However, the rice flour showed unsatisfactory qualities for producing bakery products as in the case of using unpolished rice flour 1 and 2. The reason of this was considered that trehalose did not penetrate sufficiently into unpolished rice grains when rice flour was produced with trehalose-penetration and without crushing, because unpolished rice grains have a hard outer layer such as cuticle, testa, and pericarp. While, unpolished rice flours 4 and 5, both produced with crushing and trehalose-penetration, showed a suppressed smell of rice bran and gave fermented breads having a good taste. However, unpolished rice flour 5, having a relatively high moisture content of 12.4%, imparted a better quality to a fermented bread having a large bulk than in the case of using unpolished rice flour 4, having a relatively low moisture content of 6.7%.

EXPERIMENT 1-2

Rice Flour Produced from Polished Rice Using Trehalose

Except for using a domestic polished rice grains of a variety of "AKEBONO", five kinds of polished rice flours were produced according to the procedure described in Experiment 1-1 and evaluated on their qualities including those for producing bakery products. The results are in Table 3. The polished rice flours 1, 2, 3, 4, and 5 in Table 3 mean those produced by the processes of 1, 2, 3, 4, and 5, respectively.

TABLE 3

| Evaluation | | PRF*1 | PRF2 | PRF3 | PRF4 | PRF5 |
|---|---|---|---|---|---|---|
| Analytic | APS**(μm) | 40 | 38 | 35 | 45 | 48 |
| data of | MC*** (%) | 10.5 | 9.8 | 9.3 | 6.3 | 12.8 |
| rice flour | SRB**** | S | S | H | H | H |
| Properties | Bulk (cm) | 9.0 | 9.2 | 10.5 | 11.0 | 12.5 |
| for bakery products | Taste | No good | No good | Good | Good | Good |
| Overall evaluation | | No good | No good | Good | Good | Better |

*Polished rice flour
**Average particle size
***Moisture content
****Smell of rice bran As shown in Table 3, polished rice flour 1, produced without the processes of crushing and trehalose-penetration, showed a slight smell of rice bran. The quality of polished rice flour 1 was evaluated as unsatisfactory because it gave bread with a relatively small bulk and unsatisfactory bulge and taste when evaluated with respect to the properties for producing bakery products. Polished rice flour 2, produced with crushing but not with trehalose-penetration, showed unsatisfactory qualities as in the case of polished rice flour 1. Polished rice flour 3, produced with trehalose-penetration but not with crushing, showed almost no smell of rice bran. Although the rice flour gave bread having a good taste, the bulk of which was unsatisfactory. The reason of this was considered that trehalose did not penetrate sufficiently into the polished rice grains because the polished rice flour was produced without crushing. On the other hand, polished rice flours 4 and 5, both produced with crushing and trehalose-penetration, showed a suppressed smell of rice bran and gave fermented bread having a good taste. However, polished rice flour 5, having a relatively high moisture content of 12.8%, showed a better quality of giving fermented bread having a large bulk than those prepared with polished rice flour 4, having a relatively low moisture content of 6.3%.

EXPERIMENT 1-3

Rice Flour Produced from Unpolished Rice Using Maltitol

Except for using maltitol instead of trehalose as a saccharide for penetration, five kinds of unpolished rice flours were produced according to the procedure described in Experiment 1-1 and evaluated the qualities including the properties for producing bakery products. The results are in Table 4. Unpolished rice flours 1, 2, 3, 4, and 5 in Table 4 mean those produced by the processes of 1, 2, 3, 4, and 5, respectively.

TABLE 4

| Evaluation | | URF*1 | URF2 | URF3 | URF4 | URF5 |
|---|---|---|---|---|---|---|
| Analytic data of rice flour | APS**(μm) | 42 | 46 | 55 | 53 | 51 |
| | MC*** (%) | 10.4 | 11.1 | 10.3 | 6.1 | 13.2 |
| | SRB**** | C | C | H | H | H |
| Properties for bakery products | Bulk (cm) | 9.0 | 9.2 | 9.0 | 10.5 | 12.0 |
| | Taste | No good | No good | No good | Good | Good |
| Overall evaluation | | No good | No good | No good | Good | Better |

*Unpolished rice flour
**Average particle size
***Moisture content
****Smell of rice bran As shown in Table 4, unpolished rice flour 1, produced without the processes of crushing and maltitol-penetration showed a strong smell of rice bran. The quality of unpolished rice flour 1 was evaluated as unsatisfactory because it gave bread showing a relatively small bulk and unsatisfactory bulge and taste when evaluated with respect to the properties for producing bakery products. Unpolished rice flour 2, produced with crushing but not with maltitol-penetration, showed unsatisfactory qualities as in the case of unpolished rice flour 1. Unpolished rice flour 3, produced with maltitol-penetration but not with crushing, showed a suppressed smell of rice bran by incorporating maltitol. However, the rice flour showed unsatisfactory qualities for producing bakery products as in the case of unpolished rice flour 1 and 2. The reason of this was considered that maltitol did not penetrate sufficiently into the unpolished rice grains when rice flour was produced with maltitol-penetration and without crushing because unpolished rice grains have a hard outer layer such as cuticle, testa, and pericarp. On the other hand, unpolished rice flours 4 and 5, both produced with crushing and maltitol-penetration, showed a suppressed smell of rice bran and gave fermented bread having a good taste. However, unpolished rice flour 5, having a relatively high moisture content of 13.2%, showed a better quality of giving fermented bread having a large bulk than those prepared with unpolished rice flour 4, having a relatively low moisture content of 6.1%.

EXPERIMENT 1-4

Rice Powder Produced from Polished Rice Using Maltitol

Except for using a domestic polished rice grains of a variety of "AKEBONO", and maltitol instead of trehalose, five kinds of polished rice flours were produced according to the procedure described in Experiment 1-1 and evaluated their qualities of including the properties for producing bakery products. The results are in Table 5. Polished rice flours 1, 2, 3, 4, and 5 in Table 5 mean those produced by the processes of 1, 2, 3, 4, and 5, respectively.

TABLE 5

| Evaluation | | PRF*1 | PRF2 | PRF3 | PRF4 | PRF5 |
|---|---|---|---|---|---|---|
| Analytic data of rice flour | APS**(μm) | 39 | 35 | 38 | 45 | 43 |
| | MC*** (%) | 10.5 | 9.8 | 9.3 | 5.9 | 12.8 |
| | SRB**** | S | S | H | H | H |
| Properties for bakery products | Bulk (cm) | 10.3 | 10.1 | 10.5 | 11.0 | 11.2 |
| | Taste | No good | No good | Good | Good | Good |
| Overall evaluation | | No good | No good | Good | Good | Better |

*Polished rice flour
**Average particle size
***Moisture content
****Smell of rice bran As shown in Table 5, polished rice flour 1 produced without the processes of crushing and maltitol-penetration showed a slight smell of rice bran. The quality of polished rice flour 1 was evaluated as unsatisfactory because it gave bread showing a relatively small bulk and unsatisfactory bulge and taste when evaluated with respect to the properties for producing bakery products. Polished rice flour 2, produced with crushing but not with maltitol-penetration, showed unsatisfactory qualities as in the case of polished rice flour 1. Polished rice flour 3, produced with maltitol-penetration but not with crushing, showed almost no smell of rice bran. Although the rice flour gave bread having a good taste, the bulk of which was unsatisfactory. The reason of this was considered that maltitol did not penetrate sufficiently into the polished rice grain because they were produced without-crushing. On the other hand, polished rice flours 4 and 5, both produced with crushing and maltitol-penetration, showed a suppressed smell of rice bran and gave fermented bread having a good taste. However, polished rice flour 5, having a relatively high moisture content of 12.8%, showed a better quality of giving fermented bread having a large bulk than those prepared with polished rice flour 4, having a relatively low moisture content of 5.9%.

The following examples concretely explain the present invention. Examples A explain the production of rice flours. Further, Examples B explain the preparation of premixed flours for producing bakery products and bakery products obtained by using those flours:

EXAMPLE A-1

Production of Rice Flour from Unpolished Rice

Unpolished rice grains of a domestic variety of "AKEBONO" were soaked in two-folds by weight of water for 16 hours for allowing to absorb water and then washed with water to remove impurities. Successively, cracked rice grains were prepared by subjecting the resulting rice grains to "SUZUKI NOODLE MAKING MACHINE", a roll-type noodle making machine commercialized by Suzukimenko Co., Ltd., Okayama, Japan, whose slit width was adjusted to 1.5 mm, for crushing. Then, "TREHA®", a high purity hydrous crystalline trehalose product (trehalose content: 98.0% or higher) commercialized by Hayashibara Shoji Inc., Okayama, Japan, was penetrated into the rice grain by sifting the saccharide over the grains in an amount of 10% to the weight of the material rice grains and keeping the mixture at ambient temperature for 50 minutes with gentle stirring. Successively, the resulting unpolished rice grains were partially dried by heating at 60° C. for four hours to give a moisture content about 24%. The resulting partially-dried unpolished rice grains were milled using "TORNADO MILL", a dry-type micro-pulverizing mill commercialized by Nikkiso Co., Ltd., Tokyo, Japan, whose outlet temperature was controlled at 60° C., and the resulting fine unpolished rice flour, having an average particle size of 60 μm and a moisture content of 13%, was collected by sieving with a sifter. The unpolished rice flour thus obtained is rich in amino acids, vitamins, and minerals, and it has a satisfactory quality with a suppressed smell of rice bran because of the incorporation of trehalose. Thus, the product can be advantageously used as materials for various processed foods such as bakery products and noodles.

EXAMPLE A-2

Production of Rice Flour from Polished Rice

Polished rice grains of a domestic variety of "AKEBONO" were soaked in three-folds by weight of water for eight hours for allowing to absorb water and then washed with water to remove impurities. Successively, the resulting polished rice grains were roughly crushed using "Three-roll Mill type S", a roll-type milling machine commercialized by Inoue Sei-sakusho Co., Ltd., Kanagawa, Japan, whose slit width was adjusted to 2.5 mm. Then, trehalose was penetrated into the roughly crushed rice grains by uniformly spraying 30% (w/w) aqueous solution of "TREHA®", a high purity hydrous crystalline trehalose product (trehalose content: 98.0% or higher) commercialized by Hayashibara Shoji Inc., Okayama, Japan, in an amount of 30% to the weight of the material rice grains and keeping for 45 minutes with gentle stirring. Successively, the resulting roughly crushed polished rice grains were partially dried by heating at 50° C. for 10 hours to give a moisture content of about 18%. The resulting partially-dried polished rice grains were milled using "Three-roll Mill type S", a roll-type milling machine commercialized by Inoue Seisakusho Co., Ltd., Kanagawa, Japan. After partially drying the resulting rice flour to give a moisture content of 10%, fine polished rice flour having an average particle size of 80 µm was collected by sieving with a sifter. The polished rice flour thus obtained has a satisfactory quality with a suppressed smell of rice bran because of the incorporation of trehalose. Thus, the product can be advantageously used as materials for various processed foods such as bakery products and noodles.

EXAMPLE A-3

Production of Rice Flour from Unpolished Rice

Select unpolished rice grains of domestic variety of "HINOHIKARI" were soaked in three-folds by weight of water for 16 hours for allowing to absorb water and then washed with water to remove impurities. Successively, cracked rice grains were prepared by subjecting the resulting rice grains to "SUZUKI NOODLE MAKING MACHINE", a roll-type noodle making machine commercialized by Suzuki-menko Co., Ltd., Okayama, Japan, whose slit width was adjusted to 1.5 mm, for crushing. Then, maltitol was penetrated into the cracked rice grains by uniformly spraying 30% (w/w) aqueous solution of "FUNMATSU MABIT®", a powdery maltitol product (maltitol content: 93.5% or higher) commercialized by Hayashibara Shoji Inc., Okayama, Japan, in an amount of 30% to the weight of material rice and keeping for 45 minutes with gentle stirring. Successively, the resulting unpolished rice grains were partially dried by heating at 60° C. for four hours to give a moisture content of about 22%. The resulting partially-dried unpolished rice grains were milled using "Three-roll Mill type S", a roll-type milling machine commercialized by Inoue Seisakusho Co., Ltd., Kanagawa, Japan. After drying the resulting unpolished rice flour to give a moisture content of 13%, and fine unpolished rice flour having an average particle size of 80 µm was collected by sieving with a sifter. Unpolished rice flour thus obtained is rich in amino acids, vitamins, and minerals, and has a satisfactory quality with a suppressed smell of rice bran because of the incorporation of maltitol. Thus, the product can be advantageously used as materials for various processed foods such as bakery products and noodles.

EXAMPLE A-4

Production of Rice Flour from Polished Rice

Polished rice grains of a domestic variety of "ASAHI" were soaked in two-folds by weight of water for eight hours for allowing to absorb water and then washed with water to remove dirt impurities. Successively, the resulting polished rice grains were roughly crushed using "Three-roll Mill type S", a roll-type milling machine commercialized by Inoue Seisakusho Co., Ltd., Kanagawa, Japan, whose slit width was adjusted to 2.5 mm. Then, "FUNMATU MABIT®", a powdery maltitol product (maltitol content: 93.5% or higher) commercialized by Hayashibara Shoji Inc., Okayama, Japan, was penetrated into the roughly crushed rice grains by sifting the saccharide over the grains in an amount of 10% to the weight of the material rice grains and keeping at room temperature for 60 minutes with gentle stirring. Successively, the resulting polished rice grains was partially dried by heating at 50° C. for 10 hours to give a moisture content of about 15%. The resulting partially-dried polished rice grains were milled using "TORNADO MILL", a dry-type micro-pulverizing mill commercialized by Nikkiso Co., Ltd., Tokyo, Japan. After partially drying the resulting rice flour to give a moisture content of 12%, fine polished rice flour having an average particle size of 70 µm was collected by sieving with a sifter. Polished rice flour thus obtained has a satisfactory quality with a suppressed smell of rice bran because of the incorporation of maltitol. Thus, the product can be advantageously used as materials for various processed foods such as bakery products and noodles.

EXAMPLE B-1

Premixed Flour for Producing Bakery Products with Rice Flour

One hundred parts by weight of unpolished rice flour, obtained in Example A-1, 15 parts by weight of "GLURICH A", a gluten commercialized by Chiba Seifun Co. Ltd., Chiba, Japan, five parts by weight of "SUNMALT S", a purified maltose product (maltose content: 92.0% or higher) commercialized by Hayashibara Shoji Inc., Okayama, Japan, and one part by weight of "MAGIC FAT 250", a powdery fat commercialized by Miyoshi Oil & Fat Co., Ltd., Tokyo, Japan, were mixed using a blender to produce a premixed flour for producing bakery products.

The premixed flour, comprising unpolished rice flour, is rich in amino acids, vitamins, and minerals and can be advantageously used for producing bakery products being rich in nutritional value. Further, since the unpolished rice flour contains trehalose, it can be expected that the generation of smell of rice bran will be suppressed when the premixed flour is preserved for a long time.

EXAMPLE B-2

Premixed Flour for Producing Bakery Products with Rice Flour

One hundred parts by weight of polished rice flour, obtained in Example A-2, 20 parts by weight of "GLURICH A", a gluten commercialized by Chiba Seifun Co. Ltd., Chiba, Japan, two parts by weight of "TREHA®", a high purity hydrous crystalline trehalose (trehalose content: 98.0% or higher) commercialized by Hayashibara Shoji Inc., Okayama, Japan, four parts by weight of "FUNMATSU MABIT", a maltitol product (maltitol content: 93.5% or higher) commercialized by Hayashibara Shoji Inc., Okayama, Japan, three parts by weight of "PULLULAN PF-20", a pullulan product commercialized by Hayashibara Shoji Inc., Okayama, Japan, were mixed using a blender to produce a premixed flour for producing bakery products.

The premixed flour can be advantageously used for producing fermented bakery products. Further, since the premixed flour contains trehalose and maltitol, it can be expected that the generation of smell of rice bran will be suppressed when the premixed flour is preserved for a long time.

EXAMPLE B-3

Unpolished Rice Flour Bread

Seventy two parts by weight of unpolished rice flour, obtained in Example A-1, 8 parts by weight of "GLURICH A", a gluten commercialized by Chiba Seifun Co. Ltd., Chiba, Japan, four parts by weight of "TREHA®", a high purity hydrous crystalline trehalose (trehalose content: 98% or higher) commercialized by Hayashibara Shoji Inc., Okayama, Japan, 1.6 parts by weight of sodium chloride, 2.4 parts by weight of sucrose, 2.4 parts by weight of skim milk, two parts by weight of "KAIYO KOBO", a yeast commercialized by Sankyo Foods Co., Ltd., Tokyo, Japan, 1.6 parts by weight of "PULLULAN PF-20", a pullulan product commercialized by Hayashibara Shoji Inc., Okayama, Japan, four parts by weight of butter and 64 parts by weight of water were kneaded by a kneader at 23° C. for six minutes at a low speed and for three minutes at a moderate speed. After suspending the kneading for a while, the mixture was further kneaded for four minutes to make into a dough. Successively, the dough was fermented for 50 minutes as "floor time". After dividing and rounding the dough, the dough was fermented for 20 minutes as "bench time". Then, the dough was placed in a tin to shape into open top bread and further fermented for 50 minutes using a proofing room controlled at 40° C. and a humidity of 80%. After the fermentation, the dough was baked for 45 minutes in an oven which the upper and lower temperatures were controlled to 230° C. and 200° C., respectively, to produce unpolished rice flour-open top bread.

The unpolished rice flour-open top bread, obtained by the present Example, showed a satisfactory bulk and taste. Since the bread was produced from unpolished rice flour, the bread was rich in amino acids, vitamins, minerals and nutritional value. Further, since the bread comprised trehalose, it was a high quality bread whose smell of rice bran was suppressed.

EXAMPLE B-4

Polished Rice Flour Bread

Eighty parts by weight of polished rice flour, obtained in Example A-2, eight parts by weight of "GLURICH A", a gluten commercialized by Chiba Seifun Co. Ltd., Chiba, Japan, 10 parts by weight of sucrose, 1.8 parts by weight of sodium chloride, two parts by weight of skim milk, two parts by weight of "KAIYO KOBO", a yeast commercialized by Sankyo Foods Co., Ltd., Tokyo, Japan, two parts by weight of "CELLOGEN", a carboxymethyl-cellulose sodium salt commercialized by Dai-ichi Kogyo Seiyaku Co., Ltd., Kyoto, Japan, 10 parts by weight of fresh cream, five parts by weight of sugar-free condensed milk, four parts by weight of shortening, and 80 parts by weight of water were kneaded by a kneader at 23° C. for six minutes at a low speed and for three minutes at a moderate speed. After suspending the kneading for a while, the mixture was further kneaded for four minutes to make into dough. Successively, the dough was fermented for 60 minutes as "floor time". After dividing and rounding the dough, the dough was fermented for 20 minutes as "bench time". Then, the dough was placed in a tin to shape into open top bread and further fermented for 50 minutes using a proofing room controlled at 40° C. and a humidity of 80%. After the fermentation, the dough was baked for 45 minutes in an oven which the upper and lower temperatures were controlled to 230° C. and 200 ° C., respectively, to produce polished rice flour-open top bread.

The polished rice flour-open top bread, obtained by the present Example, showed a satisfactory bulk and taste. Further, since the bread comprised trehalose, it was a high quality bread whose smell of rice bran was suppressed.

EXAMPLE B-5

Rice Flour Chinese Steamed Bread

One hundred thirty parts by weight of a premixed flour for producing rice flour bakery products, obtained in Example B-2, five parts by weight of sucrose, two parts by weight of "KAIYO KOBO", a yeast commercialized by Sankyo Foods Co., Ltd., Tokyo, Japan, two parts by weight of skim milk, two parts by weight of lard, 1.5 parts by weight of baking powder for steaming, and 90 parts by weight of water were kneaded by a kneader at 24° C. for six minutes at a low speed and for three minutes at a moderate speed. After suspending the kneading for a while, the mixture was further kneaded for three minutes at a moderate speed to make into a dough. Successively, the dough was fermented for 50 minutes as "floor time". After dividing the dough into 50 grams each, cooked-ingredient was put into the dough and the dough was shaped. Then, the dough was fermented at room temperature for 40 minutes. After the fermentation, the resulting dough was steamed for 10 minutes over high flame using a steamer to make into rice flour Chinese bread.

The rice flour Chinese bread, obtained by the present Example, showed a satisfactory bulk and taste. Further, since the bread comprised trehalose, it was a high quality Chinese bread whose smell of rice bran was suppressed.

EXAMPLE B-6

Rice Flour Noodle

Eighty parts by weight of polished rice flour, obtained in Example A-4, eight parts by weight of "GLURICH A", a gluten commercialized by Chiba Seifun Co. Ltd., Chiba, Japan, 4.5 parts by weight of sodium chloride, and 35 parts by weight of water were kneaded and prepared into dough for noodles by conventional method. Then, noodle with a thickness of 0.9 mm was prepared. The resulting noodle was boiled for five minutes and cooled to make into rice flour noodle.

The rice flour noodle, obtained by the present Example, showed a satisfactory taste. Further, since the noodle comprised maltitol, it was a high quality rice flour noodle whose smell of rice bran was suppressed.

INDUSTRIAL APPLICABILITY

According to the process for producing rice flour of the present invention, satisfactory rice flours can be produced efficiently, on an industrial scale and at a lower cost independently of the kind of material rice such as unpolished, polished, and sprouted rice, using a single method. Also, high quality rice flours, having a satisfactory processing property for processed rice flour products, can be obtained by the process. Further, rice flours, whose smell of bran originated from bran and germ which contained in the rice flour product of the present invention were suppressed, can be produced by allowing to incorporate trehalose into material rice flours. Furthermore, since the process can be used for producing flours of other cereals as well as rice, it can be applied to the production of various cereal flours.

The invention claimed is:

1. A process for producing rice flour, comprising:
   (a) soaking material rice grains in water;
   (b) crushing the soaked rice grains;
   (c) penetrating $\alpha,\alpha$-trehalose or maltitol into the crushed rice grains,
      by spraying an aqueous solution containing $\alpha,\alpha$-trehalose or maltitol in an amount of 3-20% (w/w) to the weight of said material raw rice grains, or
      by dredging a powdery $\alpha,\alpha$-trehalose or maltitol in an amount of 3-20% (w/w) to the weight of said material raw rice grains;
   (d) partially drying resulting rice grains containing $\alpha,\alpha$-trehalose or maltitol to give a moisture content of 14-25% (w/w); and
   (e) milling the partially dried rice grains to produce a rice flour.

2. The process of claim 1, wherein said material rice grains are raw rice grains selected from the group consisting of unpolished, polished, and sprouted rice grains.

3. The process of claim 2, wherein the crushing step is for cracking said unpolished rice grains or crushing said polished rice grains.

4. The process of claim 1, which further comprises sieving the rice flour to give an average particle size of 30-80 μm.

* * * * *